United States Patent Office 2,905,645
Patented Sept. 22, 1959

2,905,645

POLYMERIZATION CATALYSTS

Arthur William Anderson, Wilmington, John MacMillan Bruce, Jr., Claymont, and Nicholas George Merckling and William Lawrence Truett, Wilmington, Del., assignors to E. I. du Pont de Nemours and Company, Wilmington, Del., a corporation of Delaware No Drawing. Application August 16, 1954
Serial No. 450,243

5 Claims. (Cl. 252—429)

This invention relates to novel catalyst systems which are highly valuable for the production of solid ethylene polymers and copolymers.

Heretofore, it has been widely known that ethylene can be converted to solid polymers under very high pressures in the presence of catalysts which are capable of yielding free radicals under polymerization conditions.

It has also been known heretofore (U.S. Patents 2,212,155, 2,475,520, 2,467,234) that certain metal alkyls and Grignard reagents are capable of initiating the conversion of ethylene to solid polymers through a free radical mechanism. Ethylene has also been converted to solid polymers in the presence of hydrogenation catalysts, particularly in the presence of alkali metals or alkali metal hydrides (British Patent 536,102).

Generally speaking, Friedel-Crafts type catalysts have not been effective for converting ethylene to solid polymers but instead have resulted in the formation of liquid polymers from ethylene; however, it has recently been reported that solid polymers admixed with oils can be obtained by polymerizing ethylene in the presence of aluminum chloride and titanium chloride at elevated temperatures and pressures and advantageously in the presence of HCl-binding metals like aluminum powder (Fischer, German Patent 874,215 Ausgegeben April 20, 1953).

Still more recently, it was disclosed (J.A.C.S.— 75,3879) that polymerization of styrene could be made to take place in the presence of a phenyl magnesium bromide-butyl titanate mixture. Attempts to polymerize ethylene at low pressures to solid polymers in the presence of the same mixture (in which the mol ratio of phenyl magnesium bromide to butyl titanate is 1:1, and which contains no titanium at a valence state of 2) failed, and it was thus apparent that the prior art mixture of phenyl magnesium bromide and butyl titanate in the form in which it was disclosed, is a different catalyst, and exhibits markedly different properties, as compared with the compositions to be described hereinafter.

Redox systems have frequently been disclosed for polymerization of olefinic compounds. In the past, redox systems have resulted in the formation of highly branched low density polymers, except at extremely high superpressures, at which high density ethylene polymers have been obtained heretofore. In many of these systems a heavy metal compound was employed in combination with a reducing component (cf. U.S. Patents 2,380,473 and 2,383,425). While various theories have been advanced as to the mechanism of polymerization in redox systems, the art of polymerizing olefins in the presence of such combinations of catalyst components had not heretofore advanced to the state at which predictions could be made as to which pairs of oxidizable and reducible components might give good results in the conversion of ethylene to solid polymers except, of course, by further experimentation.

It has been discovered in accordance with the present invention that extraordinary and highly useful effects are produced by combining divalent titanium with organic compounds containing ethylenic unsaturation. In specific embodiments, it has been found that titanium compounds having a valence state of two, which may be combined with two radicals (suitable examples being alkoxy radicals, alkyl radicals, and radicals which form acids when combined with hydrogen), can be used effectively in the polymerization of ethylene. Said divalent titanium is generally obtained by admixing a titanium compound having a valence state in excess of two with a reducing agent. The quantity of reducing agent which is present must be sufficient to convert the titanium at least in part to a valence state of two. Titanium trichloride is ineffective for converting ethylene to solid polymers. On the other hand, titanium dichloride is an effective catalyst for ethylene polymerization yielding solid polymers. A test for divalent titanium, which defines the presence or absence thereof, is the ability of the divalent titanium to react with liquid water to form hydrogen. Coordination of the divalent titanium with organic components, etc., does not necessarily destroy its ability as a catalyst nor destroy its ability to produce hydrogen upon reaction with liquid water; in fact, it appears that ethylene is capable of coordinating with the divalent titanium in this manner, and quite possibly this phenomenon has a bearing on the mechanism of the polymerization. There is evidence, as explained hereinafter, that compounds which complex preferentially tend to suppress the polymerization reaction. One group of the catalyst compositions of this invention contain titanium at an average valence below 3, and at least some of the titanium in said catalysts must be at a valence state of two to produce the extraordinary effects herein reported. The most active polymerization catalyst compositions have all of the titanium at a valence state of two, as measured by the hydrogen evolution method.

The nature of these coordination complexes is not fully understood, but they are active catalysts or catalyst components which are capable of initiating the polymerization of ethylene in an extremely active manner to produce solid ethylene polymers having relatively little side chain substitution. The density of the polymers obtained through the use of these coordination complexes generally exceeds at least to some extent, the density of polyethylene prepared by the use of free radical types of catalysts except those free radical polymerization processes which employ such extremely high pressures as to produce abnormally high density polyethylene as compared with polyethylene made at moderately high pressure (700 to 1200 atmospheres) by a free radical polymerization process (cf. U.S. Patent 2,586,833). Furthermore, in particular instances, the organic radical which is combined in the coordination complex may provide end groups for the solid ethylene polymer. In this connection, a coordination complex prepared from titanium tetrachloride and phenyl magnesium bromide in such proportions as to reduce the average valence of the titanium to below 3 when used as an ethylene polymerization initiator, gives rise to the formation of a solid polymer which appeared, by ultra violet absorption, to contain phenyl groups.

It is believed that the coordination complexes hereinabove described are novel compounds which have not been employed heretofore in the polymerization of ethylene. By complexing with various components it is possible to control molecular weight of the polymer; e.g. when tri-n butyl amine is the complexing agent, the molecular weight of the polymer is much lower than is obtained under the same conditions when the amine component of the complex is not present. The complexes are difficult to isolate in a pure state, but their presence can be detected from the chemical properties of the mixtures produced when a titanium compound having a valence state above 2 is reduced at least in part to a valence state of 2 and admixed with an ingredient which can form a complex with the titanium in its low state of valence.

So active, as ethylene polymerization catalysts, are the coordination complexes hereinabove described that they can be used for polymerizing ethylene to solid polymers at room temperature and atmospheric pressure. These complexes can also be employed in the manufacture of numerous olefin polymers which heretofore have not been obtainable by any polymerization method whatever.

While the polymerization of ethylene to produce solid polymers in the presence of the catalysts herein disclosed can be carried out under extremely mild conditions as stated in the preceding paragraph, it is preferable from an economic standpoint to employ moderately high pressures, suitably from 10 to 200 atmospheres or higher, in order to facilitate the handling of ethylene. Much higher pressures, up to several thousand atmospheres, can be employed, but it is not economically desirable to do this in view of the extraordinary activity of the catalysts at lower pressures. Similarly, extremely low temperatures may be employed. The preferred temperatures, however, are within the range of about 0° to 300° C.

The polymerization of ethylene according to the process of this invention, takes place most satisfactorily when the polymerization mixture if substantially moisture-free and also free of other sources of hydroxyl groups. Since water reacts with the catalyst, as hereinabove explained, the water content of the mixture should be kept at the lowest practicable minimum. As in numerous other ethylene polymerization processes, the polymerization mixture in the process of this invention is preferably kept free of oxygen since oxygen reacts with the catalyst. In practical operations, the oxygen content should preferably be held below 20 parts per million. Certain compounds which are known to be polymerizable and which are capable of coordinating with the titanium at a valence state of 2 from complexes which are too stable for optimum results, and accordingly, the presence of these compounds should preferably (although not necessarily) be avoided. In this category are ketones and esters. Hydrocarbon solvents, on the other hand, can be used quite effectively.

Among the reducing agents which are most effective for reducing the valence of the titanium to an average of below 3, the following may be mentioned:

(1) Grignard reagents.
(2) Metal alkyls or aryls and similar organometallic compounds.
(3) Zinc metal and metals above zinc in the electromotive series.
(4) Metal hydrides.

In specific embodiments, the polymerization mixtures especially those employing inert solvents, such as hydrocarbons, are homogeneous and contain the active coordination complex in a dissolved form. These homogeneous catalyst systems have certain advantages over heterogeneous catalyst systems. In the homogeneous systems, the polymerization takes place very readily in the presence of a relatively small amount of the coordination complex. In contrast with this, a somewhat larger quantity of catalyst is necessary if a heterogeneous system is employed especially if the effective surface area of the catalyst is not extremely large. Good results are obtained when the catalyst is colloidally dispersed. Attempts to employ heterogeneous systems in which the surface area of the catalyst is relatively small, have given rise to poorer results.

In contrast with the foregoing, we have observed that reduction of titanium dioxide to titanium monoxide did not produce an effective catalyst since the product thus obtained was in a non-reactive or refractory state and did not form complexes of the type required for polymerizing ethylene to solid polymers in accordance with the present invention.

The method of this invention is not only useful in the manufacture of ethylene homopolymers but is effective also in the manufacture of such copolymers as ethylene-propylene, ethylene-butadiene and other ethylene copolymers in which the comonomer is a compound containing an ethylenic bond. Many of these copolymers have properties which differ very widely from copolymers of the prior art, containing the same components.

The invention is illustrated further by means of the following examples:

*Example I.—Polymerization of ethylene using a dry solid catalyst*

Titanium tetrachloride (4 grams, 0.02 mole) was dissolved in 200 ml. of cyclohexane and 26 cc. of a 3 M ethereal solution of phenyl magnesium bromide (0.08 mole) was added rapidly. The mixture was shaken vigorously for 10 minutes, filtered under nitrogen, and the solid dried at room temperature (1.0 mm.) to yield 17 grams of a black powder which was pyrophoric.

A mixture of 6 grams of this solid in 100 ml. of cyclohexane was introduced into a 325 ml. shaker tube, the tube pressured to 500 p.s.i. of ethylene, and the mixture shaken at room temperature for 2 hours. The resulting solid polymer was washed in a Waring Blendor with methanol and hydrochloric acid in methanol, dried overnight in an air oven at 70° C. Yield 107 grams, inherent viscosity 5.4 (decahydronaphthalene). A film pressed at 200°, 20,000 p.s.i. for 3 minutes was tough and stiffer than commercial polyethylene.

*Example II.—Polymerization of ethylene using a soluble catalyst*

A solution of 5.6 grams (0.01 mole) of tetra(2-ethyl hexyl)-titanate and 200 ml. of cyclohexane was heated to 50–55° C., and the 15 ml. of a 3 M ethereal solution of phenyl magnesium bromide (0.04 mole) was added rapidly. The mixture was shaken for several minutes and a dark brown solution resulted. There was no precipitate.

This solution was introduced into a 325 ml. shaker tube. The tube pressured to 500 p.s.i. of ethylene, and the mixture was shaken at 30° C. for 2 hours. The resulting solid product was washed in a Waring Blendor with successive portions of methanol, hydrochloric acid in methanol, and acetone, and dried overnight in a 70° C. air oven, yielding 16 grams of polyethylene. A film was pressed at 200° C., 20,000 p.s.i. for 3 minutes. The resulting polymer was tough and stiffer than commercial polyethylene.

Soluble active catalysts also were prepared from titanium tetrachloride and phenyl magnesium bromide in the following solvents: furan, chlorobenzene, and n-butyl ether.

*Example III.—Polymerization of ethylene at atmospheric pressure and room temperature*

To 13.5 cc. of a 3 M ethereal solution of ethyl magnesium bromide (0.04 mole) in 200 ml. of cyclohexane was added 4 grams (0.02 mole) of titanium tetrachloride. The mixture was shaken vigorously and then a stream of ethylene was bubbled through it for 0.4 hour. The mixture was diluted with methanol, filtered, and the solid washed with methanol, hydrochloric acid in methanol, and acetone. The resulting solid polymer was dried under high vacuum at 50° C. A film pressed at 200°, 20,000 p.s.i. for 3 minutes was very tough, and had a density of 0.94.

*Example IV.—Copolymerization of ethylene with propylene*

The reaction product of 2 grams (0.01 mole) of titanium tetrachloride and 13 ml. of a 3 M ethereal solution of phenyl magnesium bromide (0.04 mole) in 200 ml. of cyclohexane was introduced into a 325 ml. shaker tube, 100 grams of propylene added, and the tube pressured to 500 p.s.i. of ethylene. The mixture was shaken at 30° C. for 2 hours, filtered, and washed and dried as previously described, yielding 12.5 grams of copolymer, having an inherent viscosity of 5.4 (decahydronaphthalene). A film pressed at 200° C., 20,000 p.s.i. for 3 minutes had a density of 0.91 (cf. U.S. Patent 2,396,677), and was qualitatively tougher and more transparent than polyethylene prepared under the same conditions. An infrared determination of methyl groups showed the presence of $3CH_3/100C$.

By decreasing the amount of propylene introduced into the reaction it was shown to be possible to decrease the value of $CH_3/100C$ and increase the density. Thus 50 grams of propylene gave a copolymer having a density of 0.92, and a methyl content of $2CH_3/100C$. Repeating the experiment again with 25 grams of propylene gave a copolymer having a density of 0.93 and a methyl content of $0.7CH_3/100C$.

*Example V.—Copolymerization of ethylene with butadiene*

A mixture of 3 grams dry solid catalyst (prepared as described in Example I) and 100 ml. of cyclohexane was introduced into a 325 ml. shaker tube. Butadiene (25 grams) was added, and the mixture was pressured to 500 p.s.i. of ethylene. The tube was shaken at room temperature for 2 hours. The product filtered, washed and dried. The yield of copolymer having an inherent viscosity of 5.7 (decahydronaphthalene) was 32 grams. A film pressed at 200°, 20,000 p.s.i. for 3 minutes had a density of 0.93 and appeared to be tougher than polyethylene prepared under the same conditions. It did not at all resemble ethylene/butadiene copolymer prepared by previously disclosed methods (U.S. Patents 2,391,095 and 2,200,429). A qualitative infrared determination showed this copolymer to contain about 10% butadiene.

*Example VI*

Ethylene was polymerized at a temperature of 100° C. and a pressure of 1000 p.s.i. for 1 hour in the presence of a mixture which was prepared by adding 26 cc. of an ether solution containing 0.04 mole phenyl lithium to 175 cc. of a solution of 0.02 mole titanium tetrachloride in 175 cc. toluene. The product was washed with an acetone-hydrochloric acid mixture then with acetone and was finally dried at 60° C. in a vacuum to give 5.0 grams of solid ethylene polymer having a density of 0.95.

*Example VII*

Ethylene was polymerized at a temperature of 100° C. and a pressure of 1000 p.s.i. for 1 hour in the presence of a mixture which was prepared by adding 27 cc. of an ether solution containing 0.04 mole phenyl lithium to a suspension of 0.02 mole titanium tetrafluoride in 175 cc. toluene. 0.9 gram of ethylene polymer having a density of 0.95 were recovered after washing and drying the polymer as described in Example VI.

*Example VIII*

A mixture consisting of 0.04 mole titanium tetrachloride, 0.01 mole lithium aluminum hydride (LiAlH₄), 175 cc. toluene and ethylene under a pressure of 1500 p.s.i. was heated at 150° C. for 1 hour. After washing and drying the resulting solid product as described in Example VI, it yielded 8.5 grams polyethylene having a density of 0.97.

*Example IX*

A mixture of 1.5 grams tetrapropyl titanate and 0.03 mole ethyl magnesium bromide in ether was subjected to treatment with ethylene in n-heptane solvent at 200° C. under a pressure of 2500 p.s.i. for 2.5 hours. 1.2 grams of solid ethylene polymer having a density of 0.94 and an inherent viscosity (decahydronaphthalene) of 0.73 were obtained.

*Example X*

A solution of 1 gram tetrabutyl titanate in n-heptane to which has been added 0.03 mole ethyl magnesium bromide dissolved in ether was heated with ethylene at 120° C. for 3 hours under a pressure of 2500 p.s.i. The resulting product yielded 1.2 grams of solid ethylene polymer having a density of 0.98.

*Example XI*

A solution of 1 gram hydroxy titanium oleate and 0.03 mole ethyl magnesium bromide in cyclohexane was heated with ethylene at 200° C. under a pressure of 2500 p.s.i. for 1.5 hours. 1.1 grams of solid polymer contaminated to some extent with oily material was obtained from the resulting product.

*Example XII*

A solution of 2 grams of octylene glycol titanate and 0.03 mole ethyl magnesium bromide-ether in cyclohexane was heated at 110° C. for 1.5 hours under a pressure of 2500 p.s.i. The resulting product yielding 3.9 grams of polyethylene having a density of 0.95.

*Example XIII*

A solution of 2 grams of triethanol amine titanate and 0.015 mole ethyl magnesium bromide-ether in cyclohexane was heated at 105° C. for 1.5 hours with ethylene at 2500 p.s.i. The resulting product yielded 1.1 grams of solid polyethylene having a density of 0.95.

*Example XIV*

Into a reaction vessel was placed 10 ml. of a 3 molar solution of ethyl magnesium bromide in diethyl ether, 7 grams of titanium trichloride, and 100 ml. of n-hexane. The vessel was evacuated and flushed with nitrogen three times, pressured to 500 p.s.i. with ethylene and heated for 2.1 hours at 93° to 160° C., maximum pressure being 2500 p.s.i. Ethylene was injected periodically during the run to keep the pressure above 1400 p.s.i. during nearly all of the polymerization period. The mixture thus obtained was withdrawn, and polymer was separated by washing with methanol-HCl, methanol-NaOH and methanol. The polymer weighed 105 grams and was so high in molecular weight as to make viscosity determination in decahydronaphthalene extremely difficult.

*Example XV*

To obtain a specimen of titanium dichloride about 50 grams TiCl₄ was dropped into a hot quartz tube (875° C.) during a one-hour period in an atmosphere of hydrogen. The tube, which had an inside diameter of about 2 cm. became plugged at this time. About 10 grams of violet-black solid was collected in a receiver at the end of the tube, the receiver contents being blanketed in hydrogen. The black-purple solid (weight 8 grams) was found to generate hydrogen when dropped into water. This was titanium dichloride. Part of this (2.7 grams) was admixed with 100 ml. cyclohexane, and used as a catalyst for ethylene polymerization in a shaker tube of 330 ml. capacity, for one hour at 195°–197° C., under a pressure of 1000 p.s.i. The yield of solid polyethylene thus obtained was about 1.5 grams.

*Example XVI*

A solution of 1.4 grams of cadmium dimethyl in about 10 ml. n-heptane was diluted with 40 cc. xylene and 75 cc. of a xylene solution containing 4 grams TiCl₄. The resulting mixture was placed in a shaker tube and subjected to an ethylene pressure of 500 p.s.i. The mixture thereupon was heated for 2 hours at 50° to 74° C. under an ethylene pressure of 500 to 740 p.s.i. The reaction product was washed with methanol and acetone, to yield 0.75 gram of solid polyethylene.

Example XVII

Ethylene was polymerized for 1 hour at a temperature of 150° C. under a pressure of 1500 to 3000 p.s.i. in the presence of 100 ml. cyclohexane, 10 ml. $Sn(Bu)_4$ and 1.1 ml. $TiCl_4$. The resulting mixture was withdrawn from the reaction vessel, washed with methanol and acetone and dried at 85° C. This yielded 48 grams of polyethylene having a density of 0.96.

Example XVIII

Polymerization of ethylene at 170° to 190° C. for 2.3 hours at 750 to 1000 p.s.i. in the presence of a solution 2.3 grams $TiCl_4$ and 0.86 gram of $Al(CH_3)_3$ in 27 ml. cyclohexane (injected portionwise) gave a product which when washed with cyclohexane and acetone yielded 46 grams of polyethylene having a melt index of 1.7.

Example XIX

Polymerization of ethylene at 139° to 155° C. for 1 hour at 6000 p.s.i. in the presence of a solution of 0.57 gram of $TiCl_4$ and 1.5 grams of $LiAl(n-hexyl)_4$ in 450 ml. cyclohexane gave a product which, when washed with cyclohexane and acetone yielded 50 grams of polyethylene, which has a molecular weight which was too high for determination of melt index.

It is to be observed that the foregoing examples are illustrative only and that numerous embodiments of the invention will occur to those who are skilled in the art.

As hereinabove indicated, the reducing component of the polymerization mixture can be varied rather widely, but it is essential that the reducing component be a sufficiently strong reducing agent and also that it be employed in sufficient quantity to reduce the valence of the titanium, at least in part, to 2.

The products obtained by polymerizing ethylene with catalysts hereinabove disclosed are solid polymers exclusively and are not contaminated with Friedel-Crafts type of oily polymers.

The activity of the catalyst depends in part upon the nature of the groups which are attached to the titanium atom. It is quite possible that this effect depends upon the varying degrees of shielding around the cation, i.e. the shielding power of the group attached to titanium influences the activity of the catalyst by influencing the tendency of the titanium to coordinate. Electrical effects may also play a part in this. On the other hand, large organic groups may be attached to the titanium with beneficial results when such groups impart solubility to the catalyst.

The quantity of catalyst employed can be varied over a rather wide range. It is desirable to employ a quantity of catalyst which is at least large enough to produce a reasonable rapid rate for a reasonably long period of time. Suitably, the preferred quantity is within the range of 0.1 to 10% based on the weight of Ti per unit weight monomer.

The polymers which are made under the conditions hereinabove described frequently have such tremendously high molecular weights that removal of catalyst by dissolving and filtering is extremely difficult. The best procedure for obtaining the polymer in a clean form is to wash with acetone-hydrochloric mixture in a Waring Blendor several times followed by washing with acetone and thereafter, if necessary, followed by several acetone-aqueous sodium hydroxide washes and finally by acetone-water wash. Finally, the polymer can be washed with acetone. The products thus obtained are generally snow-white. While this procedure is highly satisfactory for preparing clean polymer, it is to be understood that simpler procedures, such as treatment with water at elevated temperatures, will be entirely suitable for various practical applications. For other practical applications it is not essential to remove traces of catalyst.

The structure of the polyethylene made in accordance with the process of this invention evidently is characterized by being a straight chain hydrocarbon, with vinyl groups at one or both ends of at least some of the molecules. The infrared measurements indicate very little methyl substitution and a very small number of vinylidene groups with little or no trans-unsaturation or carbonyl groups.

The ethylene polymers obtained in accordance with the process of this invention are highly valuble in numerous applications especially in the form of films, molded articles, extruded insulation on wire, etc. In those embodiments in which the catalyst is not removed from the polymeric product or is only incompletely removed, the products are thermally stable, somewhat surprisingly. When the polymerization is carried out in a system in which the catalyst is dissolved in the inert medium (e.g. when the titanate ester contains octyl groups or other similar groups or when it contains methyl groups but the reducing agent contains phenyl, octyl or other similar group which can interchange with methyl) the polymer precipitates from the polymerization mixture in a form which may contain measurable amounts of titanium, e.g. as much as 0.5%. Such compositions are highly useful despite their content of titanium.

It is recognized, however, that the divalent titanium is capable of forming complexes as above described. It is also recognized that alkyl and aryl, or other hydrocarbon groups, can, by metathetical reactions, become attached to the titanium atom by primary valence bonds in either the divalent or trivalent state. Alternatively, such hydrocarbon groups can be initially attached to the titanium, prior to the reduction.

What is claimed is the following:

1. A composition of matter suitable for use in the polymerization of ethylenically unsaturated compounds comprising a substantially moisture-free inert liquid hydrocarbon medium and a polymerization catalyst consisting essentially of the mixture obtained by treating, in solution in said medium, a titanium tetrahalide in which the halogen has an atomic weight not in excess of the atomic weight of chlorine, with a reducing agent of the class consisting of lithium phenyl, $LiAl(R)_4$ compounds wherein R is a hydrocarbon radical, and metal alkyls wherein said metal is a member of the class consisting of tin and cadmium, the quantity of said reducing agent being sufficient to lower the valence state of the titanium, at least in part, to below 3.

2. The composition of claim 1 wherein the reducing agent is phenyl lithium.

3. The composition of claim 1 wherein the reducing agent is tin tetrabutyl.

4. The composition of claim 1 wherein the reducing agent is lithium aluminum tetra n-hexyl.

5. The composition of claim 1 wherein the reducing agent is cadmium dimethyl.

References Cited in the file of this patent

UNITED STATES PATENTS

| | | |
|---|---|---|
| 2,355,925 | Reid | Aug. 15, 1944 |
| 2,475,520 | Roedel | July 5, 1949 |

OTHER REFERENCES

Gilman and Jones: "Organometallic Compounds of Titanium, Zirconium and Lathanum," Jour. Org. Chem., vol. 10, Nov. 1945, pages 505–514.

UNITED STATES PATENT OFFICE
CERTIFICATE OF CORRECTION

Patent No. 2,905,645                        September 22, 1959

Arthur William Anderson et al.

It is hereby certified that error appears in the printed specification of the above numbered patent requiring correction and that the said Letters Patent should read as corrected below.

Column 3, line 39, for "from" read -- form --; column 7, line 24, for "which has" read -- which had --; line 53, for "reasonable" read -- reasonably --.

Signed and sealed this 15th day of March 1960.

(SEAL)
Attest:

KARL H. AXLINE
Attesting Officer

ROBERT C. WATSON
Commissioner of Patents